(12) United States Patent
Hsieh et al.

(10) Patent No.: US 9,170,663 B2
(45) Date of Patent: Oct. 27, 2015

(54) TOUCH INPUT DEVICE AND ELECTRONIC DEVICE USING THE SAME

(75) Inventors: Kuan-Hong Hsieh, New Taipei (TW);
Han-Che Wang, New Taipei (TW);
Li-Zhang Huang, New Taipei (TW);
Wen-Hsiang Lu, New Taipei (TW);
Ji-Bao Fu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 592 days.

(21) Appl. No.: 13/476,032

(22) Filed: May 21, 2012

(65) Prior Publication Data

US 2013/0070158 A1    Mar. 21, 2013

(30) Foreign Application Priority Data

Sep. 15, 2011   (CN) .......................... 2011 1 0273332

(51) Int. Cl.
*G06F 3/041* (2006.01)
*G06F 3/0354* (2013.01)

(52) U.S. Cl.
CPC ....... *G06F 3/03547* (2013.01); *H04M 2250/22* (2013.01)

(58) Field of Classification Search
CPC ................ G06F 3/03547; G06F 3/041; G06F 3/044–3/047; G06F 3/0488; G06F 3/048886; H04M 2250/22

USPC ..................... 345/173, 174; 178/18.01–18.08
See application file for complete search history.

(56) References Cited

U.S. PATENT DOCUMENTS

| | | | |
|---|---|---|---|
| 2008/0088597 A1* | 4/2008 | Prest et al. .................... 345/173 |
| 2008/0150906 A1* | 6/2008 | Grivna .......................... 345/173 |
| 2009/0139778 A1* | 6/2009 | Butler et al. ............... 178/18.03 |
| 2010/0156795 A1* | 6/2010 | Kim et al. ..................... 345/168 |
| 2011/0018829 A1* | 1/2011 | Peng ............................. 345/173 |
| 2011/0279169 A1* | 11/2011 | Salaverry ...................... 327/517 |

FOREIGN PATENT DOCUMENTS

| | | |
|---|---|---|
| CN | 101518058 A | 8/2009 |
| CN | 101719040 A | 6/2010 |
| CN | 201748320 U | 2/2011 |
| TW | 200832725 A | 8/2008 |
| TW | 201124880 A1 | 7/2011 |

* cited by examiner

*Primary Examiner* — Jimmy H Nguyen
(74) *Attorney, Agent, or Firm* — Novak Druce Connolly Bove + Quigg LLP

(57) ABSTRACT

A touch input device is provided. The touch input device includes a touch panel and a touch control. The touch panel includes a number of touch sensor groups, each touch sensor group includes a line of touch sensors, each touch sensor produces a touch signal in response to a user's touch, the touch sensor groups are arranged on the touch panel one by one along a predetermined path, the quantity of touch sensors of each touch sensor group is increased or decreased gradually, and the arrangement direction of the touch sensors of each touch sensor group is perpendicular to the direction of the predetermined path. The touch control is connected to the touch panel and is used to receive the touch signals produced by the touch sensor, and determine a touch path according to the changes of the quantity of the received touch signals.

5 Claims, 4 Drawing Sheets

TOUCH INPUT DEVICE AND ELECTRONIC DEVICE USING THE SAME

CROSS-REFERENCE TO RELATED APPLICATIONS

The subject matter disclosed in this application is related to subject matters disclosed in a copending application entitled, "ELECTRONIC DEVICE WITH TOUCH PANE", filed May 21, 2012 Ser. No. 13/476,030, and assigned to the same assignee as named herein.

BACKGROUND

1. Technical Field

The present disclosure relates to input devices, particularly, to a touch input device and an electronic device employing the touch input device.

2. Description of Related Art

Many electronic devices, such as mobile phones, remote controls, and media players, with touch input device are more and more popular due to convenience. The touch input device produces touch signals in response to user's touch, however, conventional touch input device determines touch path according to the sequence of the produced touch signals, and conventional touch panels are mundane when being operated.

Therefore, it is desirable to provide a touch input device and an electronic device with the touch input device to overcome the described limitations.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail, with reference to the accompanying drawings.

Figure 1:
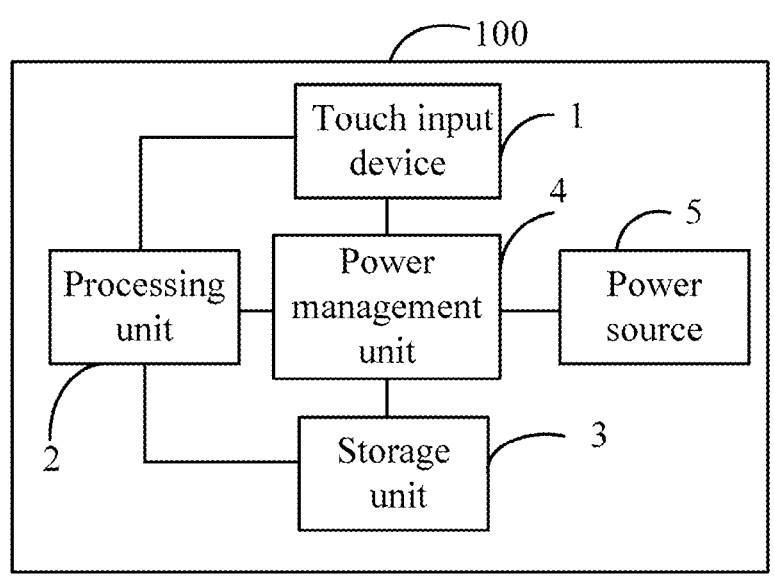
FIG. 1 is a block diagram of an electronic device with a touch input device, in accordance with an exemplary embodiment.
Figure 2:
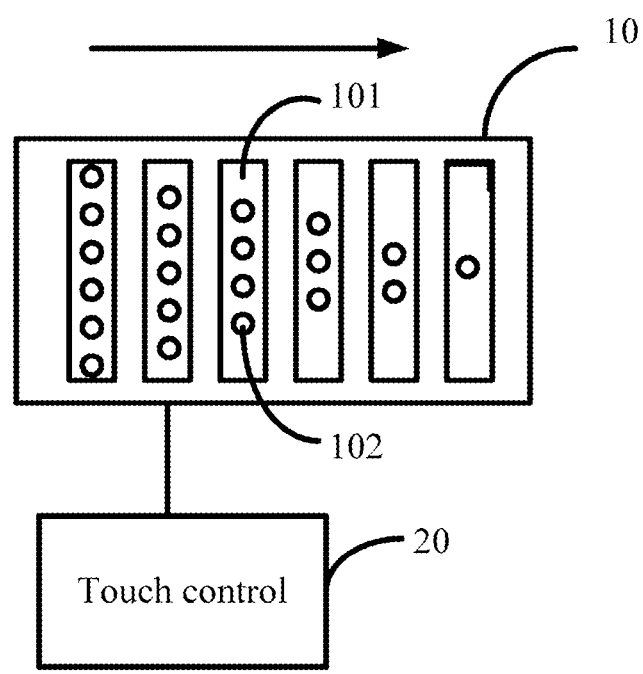
FIG. 2 is a schematic diagram of the touch input device of the electronic device of FIG. 1, in accordance with an exemplary embodiment.

FIGS. 1 and 2 illustrate an electronic device 100 including a touch input device 1, a processing unit 2, and a storage unit 3. The touch input device 1 includes a touch panel 10 and a touch control 20. The touch panel 10 includes several touch sensor groups 101. Each touch sensor group 101 includes a line of touch sensors 102, and the quantity of touch sensors 102 of each touch sensor group 101 is different. Each touch sensor 102 produces a touch signal in response to a user's touch.

In the embodiment, the touch sensor groups 101 are arranged on the touch panel 10 one by one along a predetermined path, and the quantity of touch sensors of each touch sensor group is increased or decreased gradually, and the arrangement direction of the touch sensors 102 of each touch sensor group 101 is substantially perpendicular to the direction of the predetermined path. For example, as shown in FIG. 1, the touch sensor groups 101 are arranged along the horizon direction, the touch sensors 102 of each touch sensor group 101 are arranged along the vertical direction and the quantity of touch sensors 102 of each touch sensor group 101 are decreased from left to right.

In the embodiment, the touch panel 10 is a multipoint touch panel, the touch sensor group 101 including a greatest number of touch sensor 102 can be full covered by the user's fingertip. When the user touches the touch panel 10 along the predetermined path, the touch sensor 102 touched by the user is changed gradually. The touch control 20 is connected to the touch panel 10 and receives the touch signals produced by the touch sensor 102, and determines a touch path according to the changes of the quantity of the received touch signals.

The storage unit 3 stores a relationship table defining relationships between touch paths and functions. The processing unit 2 determines a function corresponding to the touch path determined by the touch control 20 according to the relationship table, and produces a control signal to execute the function.

Figure 3:
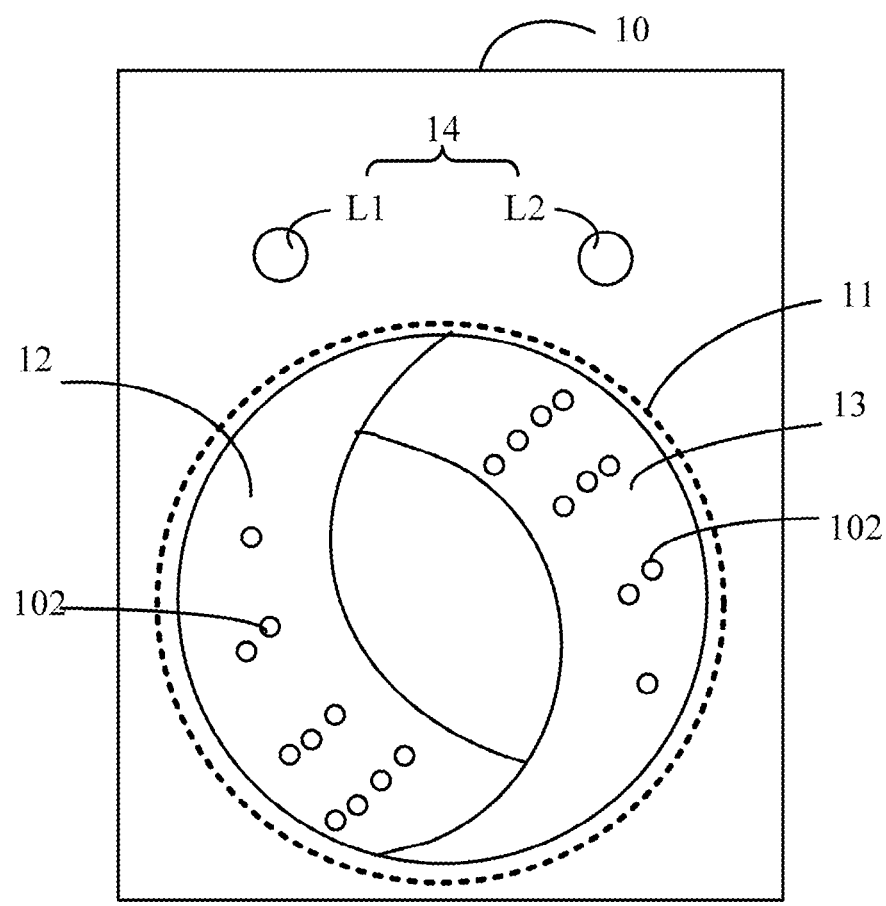
FIG. 3 is a schematic diagram of a touch panel of the touch input device of FIG. 2, in accordance with a second first embodiment.

FIG. 3 illustrates the touch panel 10 including a touch area 11. The touch area 11 includes a first touch area 12 and a second touch area 13. In the embodiment, the first touch area 12 and the second touch area 13 are respectively located on two sides of the touch area 11. The first touch area 12 and the second touch area 13 both are meniscus-shaped, and the width of the first touch area 12 and the second touch area 13 are changed gradually. The first touch area 12 and the second touch area 13 are joined end to end forming a ring. The first touch area 12 and the second touch area 13 each includes a number of touch sensor groups 101. The number of touch sensors 102 of the touch sensor group 101 arranged in the first touch area 12 and the second touch area 13 are gradually decreased as the width of the touch area 12/13 is gradually decreased.

In the embodiment, the touch sensors 102 arranged in the widest portion of the first touch area 12 and the second touch area 13 can be fully covered by the user's fingertip. In the embodiment, the touch control 20 determines the touch path is a first touch path when determining the quantity of the received touch signals decreases, and determines the touch path is a second touch path when determining the quantity of the received touch signals increases. Namely, the first touch path is defined as a touch from the wide portion to the narrow portion of the first touch area 12 and the second touch area 13, and the second touch path is defined as a touch from the narrow portion to the wide portion of the first touch area 12 and the second touch area 13. In the embodiment, the relationship table stored in the storage unit 3 defines a first relationship between the first touch path and a function of decreasing a particular parameter, and a second relationship between the second touch path and a function of increasing the particular parameter. The processing unit 2 produces a control signal to decrease the particular parameter when the touch control 20 determines the touch path is the first touch path, and produces a control signal to increase the particular parameter when the touch control 20 determines the touch path is the second touch path, according to the relationship table.

In the embodiment, the electronic device 100 is a remote control for controlling lighting. The particular parameter is the brightness of the lighting. The processing unit 2 produces a control signal to decrease the brightness of the lighting when the touch control 20 determines the touch path is the first touch path, and produces the control signal to increase the brightness of the lighting when the touch control 20 determines the touch path is the second touch path. In another embodiment, the electronic device 100 is a remote control for controlling a television, and the particular parameter is volume, brightness, or contrast ratio of the television. In further another embodiment, the electronic device 100 is a remote control for controlling an air conditioner and the particular parameter is wind speed, or temperature of the air conditioner. In another embodiments, the electronic device 100 is a mobile phone, a media player or other portable electronic devices. The particular parameter is volume, brightness of the display, for example.

Obviously, if the electronic device 100 is the portable electronic device, the electronic device 100 may include some input keys to execute particular function. If the electronic device 100 is the remote control, the electronic device 100 may include communication module (not shown) to transmit the control signal produced by the processing unit 2 to control a corresponding device.

In the embodiment, the width of the first touch area 12 and the second touch area 13 are changed from wide to narrow along the clockwise direction. As shown in FIG. 3, the width of the first touch area 12 and the second touch area 13 are gradually decreased along the clockwise direction. Therefore, if the user touches the touch area 11 along the clockwise direction, no matter if the first touch area 12 or the second touch area 13 is touched, the touch control 20 determines the touch path is the first touch path, and the processing unit 2 then produces the control signal to decrease the particular parameter. If the user touches the touch area 11 along the anticlockwise direction, no matter if the first touch area 12 or the second touch area 13 is touched, the touch control 20 determines the touch path is the second touch path, and the processing unit 2 then produces the control signal to increase the particular parameter. Obviously, the width of the first touch area 12 and the second touch area 13 can also be increased from wide to narrow along the clockwise direction.

In the embodiment, the electronic device 100 also includes a power management unit 4 and a power source 5, the touch panel 10 also includes an indication unit 14, the indication unit 14 includes a first indicator L1 and a second indicator L2, and the location of the first indicator L1 and a second indicator L2 respectively correspond to the first touch area 12 and the second touch area 13. The touch control 20 also determines whether the first touch area 12 or the second touch area 13 is touched according to the received touch signals produced by the touch sensor 102. If the touch control 20 determines the first touch area 12 is touched by the user, then the processing unit 2 also controls the power management unit 4 to provide power from the power source 5 to the first indicator L1 and stop providing power to the second indicator. If the touch control 20 determines the touch area 13 is touched by the user, then the processing unit 2 controls the power management unit 4 to stop providing the power from the power source 5 to the first indicator L1 and provide power to the second indicator.

Therefore, the electronic device 100 can light the first indicator L1 or the second indicator L2 to indicate the touch area of the touch panel 10 that is touched.

Figure 4:
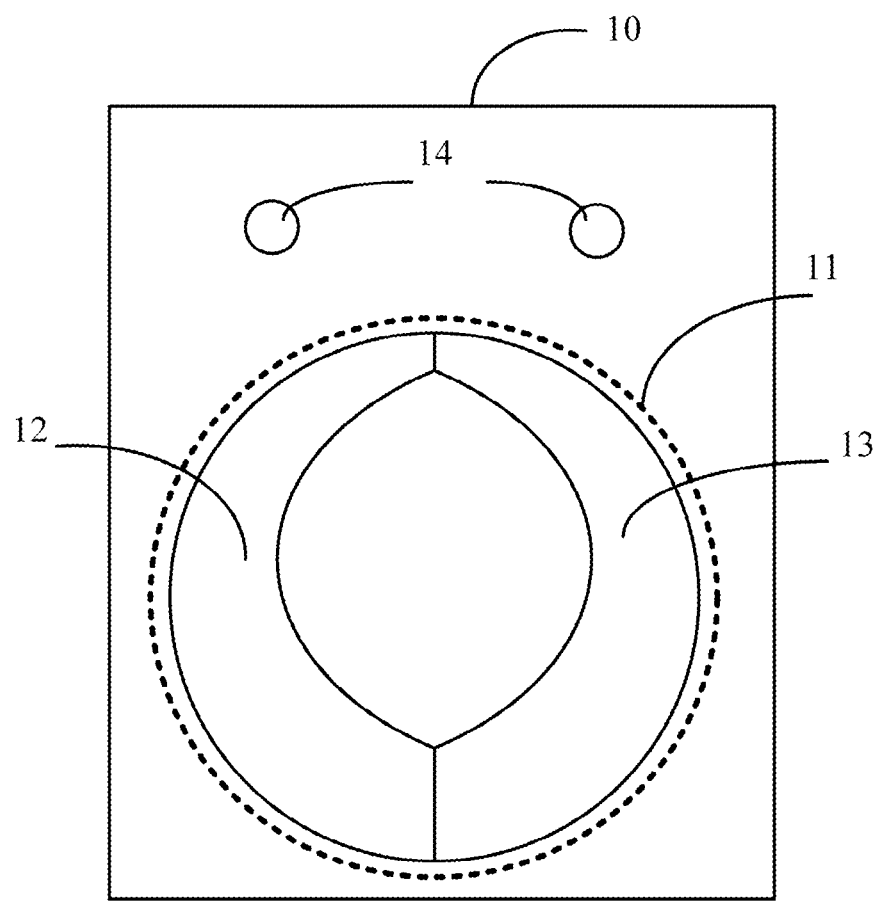
FIG. 4 is a schematic diagram of a touch panel of the e touch input device of FIG. 2, in accordance with a second embodiment.

In other embodiments, the width of one of the first touch area 12 and the second touch area 13 decreases along the clockwise direction, and the width of the other of the first touch area 12 and the second touch area 13 increases along the clockwise direction. As shown in FIG. 4, the width of the first touch area 12 is decreased along the clockwise direction and the width of the second touch area 13 is increased along the clockwise direction. Therefore, when the user touches the first touch area 12 along the clockwise direction, the touch path is the first touch path, when the user touches the second touch area 12 along the clockwise direction, the touch path is the second touch path, vice versa.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An electronic device comprising:
a touch input device comprising:
a touch panel comprising a plurality of touch sensor groups, wherein, each touch sensor group comprises a line of touch sensors, each touch sensor is configured to produce a touch signal in response to a user's touch, the plurality of touch sensor groups are arranged on the touch panel one by one along a predetermined path, the quantity of touch sensors of each touch sensor group is increased or decreased gradually, and the arrangement direction of the touch sensors of each touch sensor group is substantially perpendicular to the direction of the predetermined path; and
a touch control, connected to the touch panel and configured to receive the touch signals produced by the touch sensors, determine a touch path is a first touch path when determining a quantity of the received touch signals decreases, and determine the touch path is a second touch path when determining the quantity of the received touch signals increases;
a storage unit storing a relationship table defining a first relationship between the first touch path and a function of decrease a particular parameter, and a second relationship between the second touch path and a function of increase the particular parameter; and
a processing unit, configured to determine a function corresponding to the touch path determined by the touch control according to the relationship table, and produce a control signal to decrease the particular parameter when the touch control determines the touch path is the first touch path, and produce a control signal to increase the particular parameter when the touch control determines the touch path is the second touch path.

2. The electronic device according to claim 1, wherein the electronic device is a remote control for controlling a lighting, and the particular parameter is brightness of the lighting.

3. The electronic device according to claim 1, wherein the electronic device is a remote control for controlling a television, and the particular parameter is volume, brightness, or contrast ratio of the television.

4. The electronic device according to claim 1, wherein the electronic device is a remote control for controlling an air condition, and the particular parameter is wind speed, or temperature of the air condition.

5. The electronic device according to claim 1, wherein the electronic device is a portable electronic device comprising a mobile phone and a media player, the particular parameter is volume or brightness of the display.

* * * * *